Patented Jan. 3, 1950

2,493,733

UNITED STATES PATENT OFFICE 2,493,733

PREPARATION OF 2,2,6,6-TETRAMETHYLOL-CYCLOHEXANOL

Harold Wittcoff, Minneapolis, Minn., assignor to General Mills, Inc., a corporation of Delaware No Drawing. Application October 27, 1948, Serial No. 56,923

5 Claims. (Cl. 260—631)

The present invention relates to a procedure for the preparation of 2,2,6,6-tetramethylolcyclohexanol and more particularly to a method of isolating this compound from the reaction mixture in which it is produced by the condensation of cyclohexanone and formaldehyde.

The above product is old and its preparation has been previously described by Mannich and Brose (Ber., 56, 833 (1923)). Mannich and Brose reacted cyclohexanone and formaldehyde in the presence of calcium oxide as a catalyst and allowed the reaction mixture to stand at approximately room temperature for several days. Thereafter they precipitated the catalyst with sulfuric acid to obtain an aqueous solution of the product. The water was then evaporated to yield a syrup from which the 2,2,6,6-tetramethylcyclohexanol was eventually crystallized. By this procedure Mannich and Brose reported about 55% crystalline material. Repetition of the Mannich and Brose procedure in the laboratory indicated that 55% was about the maximum yield which could be obtained by that procedure and that in a number of instances materially lower yields of crystalline product was obtained. Moreover the noncrystalline material sometimes amounted to as much as 60% of the yield and this was in the form of a dark colored more or less intractable syrup.

It has now been found that it is possible to prepare this crystalline product in high purity and in yields of 85–90% by means of a modified procedure. The modified procedure involves the neutralization of the calcium oxide catalyst with formic acid, the evaporation of the neutralized reaction mixture to dryness, followed by the extraction of the dried reaction mixture with a low aliphatic alcohol, and the isolation of the desired product from this alcoholic solution.

It is therefore an object of the present invention to provide a novel process of preparing 2,2,6,6-tetramethylolcyclohexanol and for the isolation of this product from the reaction mixture in high yield.

The 2,2,6,6-tetramethylolcyclohexanol may be prepared according to any of the procedures which are well known. It is preferred, however to employ the process set forth in my copending application, Serial No. 599,947, filed June 16, 1945, now Patent No. 2,462,031, entitled Condensation of ketones with formaldehyde. According to this application, the cyclohexanone and formaldehyde are reacted in an aqueous medium in the presence of a fractional mole of calcium oxide. The amount of calcium oxide may vary between .25 and .75 mole per mole of ketone. Preferably the amount of catalyst is .625 mole per mole of ketone. The formaldehyde is employed in a very slight excess over that required to react with each of the active hydrogens and to reduce the ketone. The reaction is allowed to proceed at about 40° C. for 50–60 minutes, although it is possible to employ higher temperatures up to 100° C. At the more elevated temperatures, the reaction is completed in a very short time, and in many instances is essentially complete after 15 minutes. In general, the reaction should not be allowed to proceed for longer than one hour. When the reaction is complete, it is stopped by making the reaction mixture neutral or even slightly acidic with formic acid. Usually a pH of 5 to 7 after neutralization is desirable.

After the aqueous reaction mixture has been neutralized, it is then evaporated to dryness, preferably in vacuo, to obtain a solid mixture of 2,2,6,6-tetramethylolcyclohexanol and calcium formate. A very small amount of syrupy material may also be present. The desired product is separated from the inorganic material by extracting the dried material with a low aliphatic alcohol such as methanol or ethanol. The desired product dissolves readily in this solvent whereas the inorganic material is practically completely insoluble and settles to the bottom of the vessel from which the alcoholic solution may then be decanted. The extreme insolubility of the formate in the alcohol is demonstrated by the fact that the isolated product has an ash content of only about 0.1%. From this alcoholic solution the desired product can be recovered by simply removing the solvent to yield a relatively pure compound. If further purification is desired, it may be effected by washing the thus isolated product with acetone in which the 2,2,6,6-tetramethylolcyclohexanol is insoluble, but in which any syrupy material which may be present is soluble.

Another way of producing a pure 2,2,6,6-tetramethylolcyclohexanol is by concentrating the alcoholic solution to a rather small volume rather than concentrating it to dryness. From this concentrated solution the desired compound will crystallize in pure form and any syrupy material which may accompany the desired product will remain dissolved in the concentrated solution.

By this procedure it has been possible to produce repeatedly yields of 85–90% of crystalline material. Furthermore in comparison to the production of 60% of a dark colored intractable syrup which was experienced in the reproduction of the Mannich and Brose work, it was found that the syrupy products which are produced according to the present procedure amount to 10% or less and are light in color and can therefore be utilized as polyhydric alcohols of lower degrees of hydroxylation. Furthermore, the crystalline product obtained had a very low ash content and was of analytical purity. The calcium formate which was removed in the insoluble state from the alcoholic solution was analyzed for calcium and was found to contain practically the theoretically required amount of calcium.

The following examples will serve to illustrate the invention:

*Example 1*

A mixture of 196 parts of cyclohexanone, 330 parts of paraformaldehyde and 1800 parts of water is cooled to 10–15° C. and 70 parts of calcium oxide are added in 10–15 minutes. The temperature during the addition is maintained at 40° C. with cooling if necessary. Thereafter the reaction mixture is stirred for one-half hour at 40° C., whereupon it is made neutral or slightly acidic (pH=5–7) with formic acid. The solution is evaporated under reduced pressure to dryness and the residue is treated with 750 parts of methanol. Upon slight heating the product dissolves and the calcium formate settles to the bottom of the vessel. The alcoholic solution of product is decanted and the alcohol is removed under reduced pressure to obtain a white crystalline solid. This material is triturated with acetone and filtered. There results 387 parts (88%) of 2,2,6,6-tetramethylolcyclohexanol. Evaporation of the acetone washings yields about 40 parts of a light-colored syrup.

*Example 2*

The reaction is carried out as in Example 1 except that an equivalent amount of methanol-free aqueous formaldehyde is used. The methanol solution of product obtained as above is concentrated to a volume containing roughly 15% of the original methanol used. This solution on standing yields 360 parts (80%) of pure 2,2,6,6-tetramethylolcyclohexanol. The mother liquor on standing yields more of the product so that the total yield is never less than 85%. The syrupy reaction products remain in the mother liquor.

*Example 3*

A mixture of 30 pounds of cyclohexanone, 50 pounds of paraformaldehyde, and 368 pounds of water was placed in a kettle. A slurry of 12.5 pounds of calcium hydroxide in 15 pounds of water was added over a period of one hour. The initial temperature of 15° C. rose to 40° C. by the end of the addition. The reaction mixture was stirred throughout. The temperature of 40° C. was maintained for one-half hour longer, whereupon the reaction mixture was neutralized with 3.6 pounds of technical formic acid. The volatile material was then removed in vacuo at 40–50° C. and the resulting mixture of product and calcium formate was treated with 200 pounds of technical ethanol. The product dissolved readily on slight heating and stirring, and the calcium formate settled to the bottom of the reaction vessel. The supernatant liquid was removed and was clarified by filtration through a filter press. Approximately 85% of the solvent was then removed by distillation in vacuo. The residue was placed in a stainless steel tank where it was stirred. Crystallization occurred readily. The product was filtered and was washed with a small portion of ethanol and with acetone. It melted sharply at 130–131° C., demonstrated a hydroxyl content of 37%, a carbon content of 54.36 (theoretical=54.51%) and a hydrogen content of 9.12% (theoretical=9.16%).

It will be apparent from the foregoing description that the present invention provides a process of obtaining 2,2,6,6-tetramethylolcyclohexanol in great purity and in high yield. This is in contrast to prior methods of preparing this compound which have resulted in the production either of a syrupy compound or in the production of the crystalline compound in very low yields.

While various modifications of the invention have been described, it is to be understood that other variations in the process may be made without departing from the spirit thereof.

I claim as my invention:

1. Process of isolating 2,2,6,6-tetramethylolcyclohexanol from an aqueous reaction mixture resulting from the condensation of cyclohexanone and formaldehyde in the presence of a calcium oxide catalyst, which comprises rendering the aqueous reaction mixture slightly acidic with formic acid, evaporating the reaction mixture to dryness and extracting the dried reaction mixture with a low aliphatic alcohol to dissolve the 2,2,6,6-tetramethylolcyclohexanol, and separating the alcoholic solution from the insoluble inorganic material.

2. Process of isolating 2,2,6,6-tetramethylolcyclohexanol from an aqueous reaction mixture resulting from the condensation of cyclohexanone and formaldehyde in the presence of a calcium oxide catalyst, which comprises adding formic acid to the reaction mixture to adjust the pH to within the approximate range of 5 to 7, evaporating the resultant reaction mixture to dryness, extracting the dried reaction mixture with methanol, separating the methanol extract from the insoluble inorganic material, and recovering the 2,2,6,6-tetramethylolcyclohexanol from the alcoholic extract.

3. Process of isolating 2,2,6,6-tetramethylolcyclohexanol from an equeous reaction mixture resulting from the condensation of cyclohexanone and formaldehyde in the presence of a calcium oxide catalyst, which comprises adding formic acid to the reaction mixture to adjust the pH to within the approximate range of 5 to 6, evaporating the resultant reaction mixture to dryness, extracting the dried reaction mixture with methanol, separating the methanol extract from the insoluble inorganic material, and removing the solvent from the alcoholic extract to yield crystalline 2,2,6,6-tetramethylolcyclohexanol.

4. Process of isolating 2,2,6,6-tetramethylolcyclohexanol from the aqueous reaction mixture resulting from the condensation of cyclohexanone and formaldehyde in the presence of a calcium oxide catalyst, which comprises adding formic acid to the reaction mixture to adjust the pH to within the approximate range of 5 to 7, evaporating the resultant reaction mixture to dryness, extracting the dried reaction mixture with methanol, separating the methanol extract from the insoluble inorganic material, evaporating the methanol from the alcoholic extract to yield crystalline 2,2,6,6-tetramethylolcyclohexanol, and then washing said crystalline product with acetone to remove syrupy by-products.

5. Process of isolating 2,2,6,6-tetramethylolcyclohexanol from an aqueous reaction mixture resulting from the condensation of cyclohexanone and formaldehyde in the presence of a calcium oxide catalyst, which comprises adding formic acid to the reaction mixture to adjust the pH to within the approximate range of 5 to 7, evaporating the resultant reaction mixture to dryness, extracting the dried reaction mixture with methanol, separating the methanol extract from the insoluble inorganic material, concentrating the alcoholic extract, and crystallizing the 2,2,6,6-tetramethylolcyclohexanol from the concentrated alcoholic extract.

HAROLD WITTCOFF.

No references cited.